Jan. 6, 1970
E. T. E. HURD III
3,488,590
POTENTIOMETRIC MEASURING APPARATUS WITH STRAY REJECTING BRIDGE
Filed Sept. 8, 1967
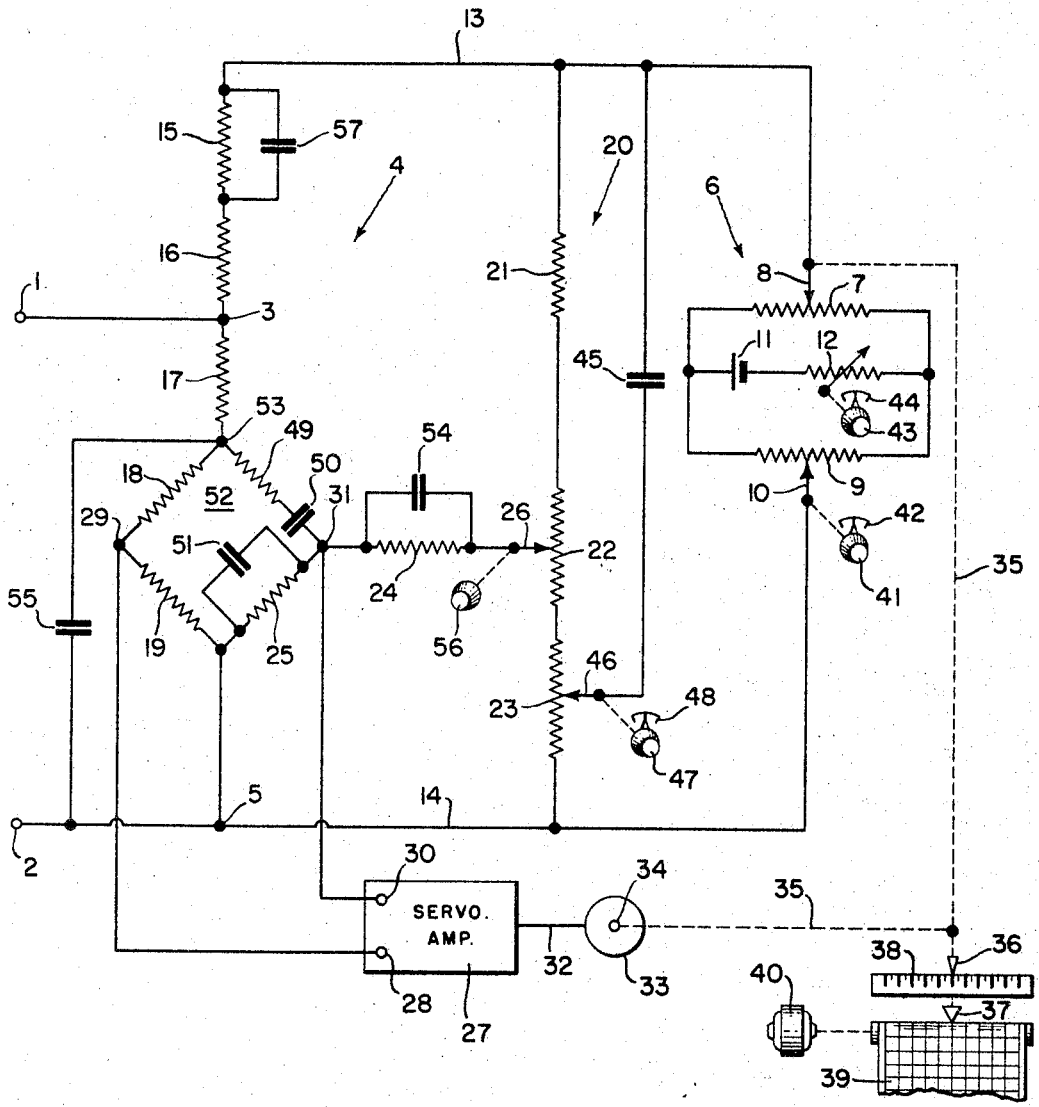
INVENTOR.
EDWARD T. E. HURD III
BY *George E. Bodenstein*
AGENT.

United States Patent Office 3,488,590
Patented Jan. 6, 1970

3,488,590
POTENTIOMETRIC MEASURING APPARATUS WITH STRAY REJECTING BRIDGE
Edward T. E. Hurd III, Willingboro, N.J., assignor to Honeywell Inc., Minneapolis, Minn., a corporation of Delaware
Filed Sept. 8, 1967, Ser. No. 666,270
Int. Cl. G01r *17/06*
U.S. Cl. 324—99  9 Claims

ABSTRACT OF THE DISCLOSURE

Apparatus including an amplifier for driving a motor which adjusts a slidewire to vary a balancing voltage applied across first and second networks. A source of a voltage to be measured is connected across a portion of the first network, and the input of the amplifier is connected between a point in each network. These points are the output of a bridge circuit which is energized by the voltage to be measured and which is tuned to be balanced for a predetermined frequency to prevent stray signals of that frequency from reaching the amplifier input. The motor adjusts the slidewire to maintain a balance in the amplifier input between portions of the voltage to be measured and the balancing voltage, and to maintain a current flow through the first network which prevents current flow from the source.

---

Subject matter disclosed by not specifically claimed herein is disclosed and claimed in the copending application of William F. Newbold, Ser. No. 336,527, filed Jan. 8, 1964 now Patent No. 3,421,082.

This invention relates generally to D.C. potentiometric or null-balance measuring apparatus, and relates specifically to apparatus of this type which is provided with means to prevent stray A.C. signals from affecting the operation of the apparatus.

A general object of this invention is to provide improved apparatus of the above type having superior stray signal rejecting characteristics. A specific object of the invention is to provide such apparatus wherein the stray signal rejecting means does not adversely affect the operating characteristics or performance of the apparatus.

It is known in the art that stray A.C. signals frequently appear in D.C. measuring apparatus of the foregoing type, usually entering by way of the conductors supplying the D.C. voltage to be measured. It is also known that the presence of such stray signals is highly undesirable, since they generally adversely affect the accuracy with which the D.C. measurements are made.

In the past, it has been proposed to embody various types of filters in apparatus of this type in an effort to reduce to the greatest possible extent the amount of stray signal reaching the null-detecting means. However, the resulting prior arrangements have suffered from one or more of the disadvantages of not having the effects of the stray signals reduced sufficiently for the purpose, of having the filtering means itself adversely affect the dynamic and/or the potentiometric operation of the apparatus, and/or of being unduly complex or costly.

It is therefore an object of this invention to provide improved potentiometric measuring apparatus wherein the stray rejecting means is many times more effective than the previously known arrangements and yet does not cause the operation of the apparatus to be adversely affected in any manner. It is a specific object of this invention to provide such improved apparatus wherein the stray rejecting means is relatively simple and does not unduly complicate the apparatus, does not adversely affect the dynamics of the apparatus balancing operations, and does not prevent the apparatus from making its measurements in a truly potentiometric manner.

To the end of fulfilling the foregoing and other desirable objects, one embodiment of this invention includes networks which apply a portion of a D.C. voltage to be measured and a portion of a balancing voltage in opposition to the input of an amplifier to form an error voltage therein. The networks are energized from a slidewire which is adjusted in balancing operations by the amplifier as necessary to maintain the error voltage substantially at zero.

To provide rejection of stray A.C. signals, the error voltage is applied to the amplifier from the output of a tuned bridge circuit which is formed by elements of said networks. The bridge circuit is energized by the voltage to be measured, and is tuned so as to be balanced for A.C. signals having the frequency of the stray signals most likely to be encountered.

As a result, no signals of this frequency, and hence no stray signals, appear in the bridge circuit output. Consequently, no stray signals are applied to the amplifier input, even though such signals may be present with the D.C. voltage energizing the bridge circuit. Thus, the rejection of stray signals is accomplished in a relatively simple though highly satisfactory manner.

Relatively simple means in the networks prevent the bridge circuit from adversely affecting the dynamics of the apparatus in performing its balancing operations. To cause the apparatus to make its measurements in a truly potentiometric manner, the balancing voltage produces a current flow in the networks which prevents any current from flowing from the source of voltage to be measured whenever the apparatus is in the balanced condition.

A better understanding of this invention may be had from the following detailed description of one form of potentiometric measuring apparatus embodying the invention. This description is to be read in connection with the accompanying drawing, in which the single figure is a schematic circuit diagram of said apparatus.

The potentiometric measuring apparatus illustrated in the drawing is of the self-balancing, indicating and recording type. This apparatus includes input terminals 1 and 2 which are arranged to be connected across the source, not shown, of the D.C. voltage which is to be measured by the apparatus. The terminal 1 is connected to a point 3 in a first network 4, and the terminal 2 is connected to a point 5 in the network 4. Accordingly, the voltage to be measured is applied to the network 4.

The apparatus also includes a source of adjustable balancing voltage in the form of a balancing network 6, including a balancing slidewire resistor 7 having an adjustable contact 8, a zero or suppression resistor 9 having an adjustable contact 10, and a source of energizing voltage 11 connected in series with an adjustable span resistor 12 across the resistor 7 and 9 in parallel. The source 11 may be a battery or a suitably regulated power supply. A conductor 13 is connected to the slidewire contact 8, and a conductor 14 is connected to the zero resistor contact 10. Accordingly, for a given setting of the contact 10 and the resistor 12, there is produced between the conductors 13 and 14 an adjustable balancing voltage which varies as the position of the contact 8 is varied along the slidewire 7.

The network 4 is connected between the conductors 13 and 14 and includes resistors 15, 16, 17, 18 and 19 connected in series in the order stated between the conductor 13 and the conductor 14. The aforementioned point 3 lies between the resistor 16 and 17, while the aforementioned point 5 lies at the connection of the resistor 19 to the conductor 14.

A network 20 is also connected between the conductors 13 and 14, and includes resistors 21, 22, 23, 24, and 25. The resistors 21, 22 and 23 are connected in series in the order stated between the conductor 13 and the conductor 14. The resistors 24 and 25 are connected in series between a contact 26, which is adjustable along the resistor 22, and the conductor 14.

As a result of the foregoing connections, a portion of the voltage to be measured appears across the resistor 19, while a portion of the balancing voltage appears across the resistor 25.

An error voltage detector to servo amplifier 27 has an input terminal 28 connected to the point 29 between the resistors 18 and 19 of the network 4, and has an input terminal 30 connected to the point 31 between the resistors 24 and 25 of the network 20. As a result, the portion of the voltage to be measured across the resistor 19 and the balancing voltage portion across the resistor 25 are applied in opposition to form an error voltage in the input between the points 29 and 31 and of the amplifier 27.

The amplifier 27 has an output connection 32. A servo or balancing motor 33, having an output shaft 34, is connected to and energized by the amplifier output 32. The amplifier 27 and motor 33 may be of any of the well-known forms of such servo apparatus, and may well be of the specific type disclosed and claimed in the Wills Patent No. 2,423,540. In the manner explained in that patent, the motor shaft 34 is caused to rotate as long as an error voltage is applied between the input terminals 28 and 30, the direction of this rotation being dependent upon the polarity of the applied error voltage. The amplifier 27 may be of the single input type disclosed in said Wills patent, or may be of the well known differential input type.

The shaft 34 is mechanically coupled by a linkage 35 to the slidewire contact 8, to an indicating pointer 36, and to a recording pen 37. This coupling is such that the rotation of the shaft 34 simultaneously adjusts or positions the contact 8 along the resistor 7, the pointer 36 along a a cooperating indicating scale 38, and the pen 37 over a cooperating recording medium 39 which is sutably advanced by a motor 40. The detailed construction and operation of such a coupling, and of the indicating and recording means adjusted therethrough, may well be as disclosed in said Wills patent.

As a result of the foregoing construction, whenever, the voltages across the resistor 19 and the resistor 25 are not equal, the error voltage is produced between the points 29 and 31 and in the input of the amplifier 27. The latter then energizes the motor 33 to move the slidewire contact 8 and to change the balancing voltage until the error voltage is reduced substantially to zero and the apparatus is balanced. In this way, a measure of the voltage to be measured is provided by the balance position of the contact 8, the pointer 36, and the pen 37.

The purpose of making the contact 10 adjustable along the resistor 9 is to permit the zero or suppression of the apparatus to be adjusted. That is, the position of the contact 10 determines the position of the electrical zero of the apparatus relative to the scale 38. To facilitate the adjustment of the contact 10, the latter is provided with a knob 41 and a cooperating scale 42.

The adjustability of the resistor 12 provides a convenient way for adjusting the span of the apparatus. To facilitating such adjustment, the resistor 12 is provided with a knob 43 and a cooperating scale 44. The apparatus span can also be changed by changing the relative values of the resistors 16 and 17. This is the equivalent of shifting the point 3 along the resistors 16 and 17. If desired, the separate resistors 16 and 17 can be replaced by a single slidewire resistor having an adjustable contact as the point 3.

In order to minimize any tendency of the apparatus to over-shoot the balance point and hence to hunt during its balancing operations, the apparatus is provided with an antihunting or damping circuit. This circuit includes a capacitor 45 which is connected between the conductor 13 and a contact 46 which is adjustable along the resistor 23. An adjusting knob 47 and a cooperating scale 48 are provided to facilitate the positioning of the contact 46 as necessary to secure the required amount of damping.

In order to provide the desired rejection of stray A.C. signals, a resistor 49 and capacitors 50 and 51 are combined with the resistors 18, 19, and 25 in accordance with the present invention to form a bridge circuit 52. Specifically, the resistor 49 is connected in series with the capacitor 50 between the point 53 between the resistors 17 and 18, and the point 31, while the capacitor 51 is connected in parallel with the resistor 25. The bridge circuit 52 thus has input terminals corresponding to the points 53 and 5, has output terminals corresponding to the points 29 and 31, and has four bridge arms including the elements 18, 19, 49 and 50, and 25 and 51, respectively.

Further in accordance with the present invention, the bridge circuit 52 is tuned so as to be balanced for input signals of a predetermined frequency or frequencies. The balance frequency to which the bridge circuit is tuned is chosen to correspond to the stray signal frequency most likely to be encountered in practice. For example, where stray signals having a frequency of 60 Hz. are prevalent, the bridge circuit 52 is desirably tuned to be balanced for 60 Hz. input signals. Since the input of the amplifier 27 is connected between the points or bridge output terminals 29 and 31, such tuning of the brige circuit 52 prevents signals at and close to the tuned frequency from reaching the amplifier input, notwithstanding the presence of such signals elsewhere in the apparatus.

Although the bridge circuit 52 provides substantially infinite attenuation of stray signals, and hence performs its stray signal eliminating function in a highly satisfactory manner, it does not seriously degrade the mechanical response or dynamic performance of the apparatus in carrying out its balancing and measuring operations. However, certain phase lag effects which the bridge circuit 52 introduces and which might be objectionable in some instances are readily eliminated in the disclosed apparatus as will now be explained.

The bridge arm including the resistor 25 and the capacitor 51 introduces a phase lag in the balancing circuit which may in some applications undesirably affect the dynamic performance of the apparatus in performing the balancing operation. To compensate for this lag, and hence to eliminate any possibly undesirable effect which it might have on the dynamic performance of the apparatus, a capacitor 54 is connected in parallel with the resistor 24. This combination introduces a phase lead into the circuit which substantially cancels the aforementioned lag. The value of the capacitor 54 and the resistor 24 must, of course, be taken into account when choosing the values for the components 25 and 51 of the bridge circuit 52 necessary to give bridge balance at the desired frequency.

A capacitor 55 is connected between the points 53 and 5, across the bridge circuit input, to introduce a phase lead to compensate for another phase lag which is produced by the bridge circuit 52. Accordingly, the capacitor 55 further prevents the bridge circuit 52 from having any possibly undesirable effect on the dynamic operation of the apparatus. Moreover, the capacitor 55 provides additional stray signal rejection in its position across the input of the bridge circuit 52.

The purpose of the aforementioned connection of the network 4 between the balancing voltage conductors 13 and 14 is to prevent the network 4 from drawing current from the source of the voltage to be measured when the apparatus is in the balanced condition. This, of course, permits the apparatus to make its measurements in a truly potentiometric manner. This connection of the network 4 causes the balancing voltage to cause a compensating current to flow through the network 4 which varies with the balancing voltage. By the proper selection of the relative values of the resistors in the networks, the compensating current will vary as the position of the slidewire contact 8 is varied so that the value of this current, at apparatus balance, will be the same as the value of the current which the source would have caused to flow through the network 4, in the absence of the compensating current, if the source had had zero internal impedance. Stated differently, the illustrated circuit causes the compensating current to make it unnecessary for the source to supply any current at apparatus balance. As a result, the impedance of the source becomes immaterial, since, with no current flow through the source, any such impedance cannot prevent the apparatus from seeing the true source voltage.

For the purpose of establishing the proper resistance relationships to secure the compensating current operation just described, it is convenient to consider the networks 4 and 20 as forming a D.C. bridge circuit. Specifically, the conductors 13 and 14 can be considered as the input terminals of this bridge circuit, while the points 29 and 31 are its output terminals. Between these input and output terminals there are then four bridge arms including the resistors 15, 16, 17, 18, 19, 21, 22, 23, 24, and 25. The input terminals 13 and 14 supply the balancing voltage to energize this D.C. bridge circuit, and the input of the amplifier 27 is connected between the output terminals 29 and 31 of this bridge circuit.

The criterion for use in establishing the proper relative values of the resistances in the above D.C. bridge circuit so as to obtain the desired compensating current action as described above is that the D.C. bridge circuit must be balanced when no source is connected between the apparatus input terminals 1 and 2. That is, there must be zero D.C. voltage between the points 29 and 31 for any position of the slidewire contact 7 when no source is connected between the terminals 1 and 2. Accordingly, the values of the resistors in the networks 4 and 20 are simply chosen so as to provide such D.C. bridge circuit balance. The adjustability of the contact 26 along the resistor 22 readily permits such balance to be achieved exactly. To facilitate the adjustment of the contact 26, the latter is provided with a knob 56.

In the foregoing manner, the illustrated apparatus can be initially adjusted so that, at the completion of each balancing operation of the apparatus, the compensating current then flowing in the network 4 will have the same value as that which the source would have been required to supply in the absence of the compensating current. As a result, the presence of the stray rejection bridge resistors 18 and 19 in the network 4 does not prevent the apparatus from making its voltage measurements in a truly potentiometric manner.

In order to prevent the adjustment of the contact 26 along the resistor 22 from disturbing the tuning or balance condition of the stray signal bridge circuit 52, the resistance value of the resistor 24 is advantageously made much higher than that of the resistor 25. This high value of the resistor 24 relative to the resistor 25 also permits the elements 24 and 54 to affect the hereinabove described dynamic compensation for the elements 25 and 51 over a desirably wide frequency range.

In order to assure that dynamic response of the apparatus is not adversely affected by high values of source resistance, a capacitor 57 is connected in parallel with the resistor 15. The capacitor 57 introduces a rate effect, and prevents the damping characteristics of the apparatus from being adversely affected by large changes in source resistance.

By way of illustration and example, and not by way of limitation, there are listed below the actual values of the various components of an actual working model of the illustrated apparatus which was found to perform in the manner described herein:

Resistor:
- 15 _____ 5 megohms ±1%.
- 16 _____ 1.238 megohms ±0.1%.
- 17 _____ 7.5K ohms ±0.1%.
- 18 _____ 2.5K ohms ±0.05%.
- 19 _____ 2.5K ohms ±0.05%.
- 21 _____ 665K ohms ±1%.
- 22 _____ 10K ohms ±10%.
- 23 _____ 20K ohms ±5%.
- 24 _____ 452.97K ohms ±0.25%.
- 25 _____ 5.4388K ohms ±0.05%.

Capacitor:
- 45 _____ 0.1 mf. ±10%.

Resistor:
- 49 _____ 2.6525K ohms ±0.05%.

Capacitor:
- 50 _____ 1.0 mf. ±0.25%.
- 51 _____ 0.475 mf. ±0.25%.
- 54 _____ 0.03 mf. ±3%.
- 55 _____ 2.0 mf. ±10%.
- 57 _____ 0.0047 mf. ±10%.

The foregoing values caused the bridge circuit 52 to be balanced for 60 Hz. stray signals.

In conclusion, it is seen that the improved apparatus according to the present invention provides a superior stray signal rejecting action by the use of a relatively simple but highly effective tuned bridge circuit without adversely affecting the dynamic performance characteristics of the apparatus, and while maintaining truly potentiometric measuring action.

The embodiments of the invention in which an exclusive property or privilege is claimed are defined as follows:

1. Potentiometric measuring apparatus comprising:
   adjustable means arranged to supply an adjustable balancing voltage between first and second conductors,
   a first network of elements connected between said conductors to cause a current to flow in said first network,
   a second network of elements connected between said conductors to cause a current to flow in said second network,
   a pair of input terminals connected to displaced points in said first network and arranged for connection across a source of voltage to be measured,
   an error voltage detector having an input connected between a first point in said first network, between said displaced points, and a second point in said second network such that at least a portion of the voltage of said source in said first network is opposed to at least a portion of said balancing voltage in said second network to form an error voltage in said input of said detector, thereby to permit the adjustment of said adjustable means and said balancing voltage to the condition in which said error voltage is reduced substantially to zero to provide a measure of the voltage of said source, said elements being proportioned to cause said current flow in said first network to prevent the flow of current from said source whenever said error voltage is substantially zero, wherein the improvement comprises
   additional elements connected to and forming with elements of said networks a tuned bridge circuit having an input energized in said first network with the voltage of said source and having an output which has as output terminals said first and second points in said networks, said elements which form said bridge circiut being proportioned to tune said bridge circuit to cause the latter to be substantially balanced for A.C. signals applied to its said input of a predetermined frequency, whereby said A.C. signals are prevented from appearing between said output terminals and in said input of said detector.

2. Apparatus as specified in claim 1, wherein said error voltage detector is connected to and controls the operation of motor means coupled to said adjustable means to adjust said balancing voltage as required to keep said error voltage substantially at zero.

3. Apparatus as specified in claim 2 wherein said networks form the arms of a further bridge circuit having an input connected between said conductors, and having an output including said first and second points as output terminals, and wherein at least one of said networks includes adjustable means adjustable to balance said further bridge circuit when there is no source connected between said input terminals.

4. Apparatus as specified in claim 2, wherein said adjustable means comprises a slidewire circuit including
   a source of energizing voltage, and
   a slidewire resistor connected across said source of energizing voltage and having a contact adjustable along said resistor,
   wherein said conductors connect said networks in parallel between said contact and a point in said slidewire circuit connected to said source of energizing voltage, and
   wherein said motor means is coupled to said contact to adjust the latter along said resistor.

5. Apparatus as specified in claim 2, wherein said elements of said first network include first and second resistors connected in series between said displaced points,
   wherein said first point is the junction between said resistors,
   wherein said first point is the junction between said a third resistor connected between said second point and the end of said second resistors remote from said first point, and
   wherein said additional elements include
   a first reactive element included in a connection between said second point and the end of said first resistor remote from said first point, and
   a second reactive element included in a connection between said second point and said end of said second resistor remote from said first point.

6. Apparatus as specified in claim 5, wherein there is included dynamic compensating means connected in said networks to offset any adverse effects of said reactive elements upon the operation of said motor means.

7. Apparatus as specified in claim 2, wherein said elements of said first network include first and second resistors connected in series between said displaced points,
   wherein said first point is the junction between said resistors,
   wherein said elements of said second network include a third resistor connected between said second point and the end of said second resistor remote from said first point, and
   wherein said additional elements include
   a first capacitor and a fourth resistor connected in series between said second point and the end of said first resistor remote from said first point, and
   a second capacitor connected in parallel with said third resistor.

8. Apparatus as specified in claim 2, wherein said elements of said first network include first, second, third, and fourth resistors connected in series between said conductors,
   wherein one of said displaced points is the junction between said first and second resistors, the other of said displaced points is the junction between said fourth resistor and said second conductor, and said first point is the junction between said third and fourth resistors,
   wherein said elements of said second network include fifth and sixth resistors connected in series between said conductors, and
   seventh and eighth resistors connected in series between an adjustable point on said sixth resistor and said second conductor,
   wherein said second point is the junction between said seventh and eighth resistors, and
   wherein said additional elements include
   a first capacitor and a ninth resistor connected in series between said second point and the junction between said second and third resistors, and
   a second capacitor connected in parallel with said eighth resistor.

9. Apparatus as specified in claim 8, wherein there is included dynamic compensating means to offset any adverse effects of said capacitors upon the operation of said motor means, said compensating means including
   a third capacitor connected in parallel with said seventh resistor, and
   a fourth capacitor connected between said second conductor and the junction between said second and third resistors.

References Cited

UNITED STATES PATENTS 2,681,431  6/1954  Wannamaker _____ 323—75 XR
3,421,082  1/1969  Newbold _____ 324—99

RUDOLPH V. ROLINEC, Primary Examiner
E. F. KARLSEN, Assistant Examiner

U.S. Cl. X.R.
324—100